(12) United States Patent
Steinbacher

(10) Patent No.: US 6,422,142 B2
(45) Date of Patent: Jul. 23, 2002

(54) INK REGULATION DEVICE FOR A PAINTING MACHINE

(75) Inventor: Eduard Steinbacher, Augsburg (DE)

(73) Assignee: Man Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 09/805,086

(22) Filed: Mar. 13, 2001

Related U.S. Application Data

(62) Division of application No. 09/238,342, filed on Jan. 27, 1999, now abandoned.

(30) Foreign Application Priority Data

Jan. 27, 1998 (DE) .......................... 198 02 920

(51) Int. Cl.⁷ .......................... B41M 1/14; B41F 31/02
(52) U.S. Cl. ....................... 101/211; 101/202; 101/484; 101/365
(58) Field of Search ................................. 101/135, 136, 101/142, 147, 148, 151, 152, 174, 178–181, 183, 220, 205–208, 229, 484, 492, 211, 348–350.1, 364–366, DIG. 45

(56) References Cited

U.S. PATENT DOCUMENTS

| 4,488,808 A | 12/1984 | Kato |
| 4,665,496 A | 5/1987 | Ott |
| 4,852,485 A | 8/1989 | Brunner |
| 4,899,653 A | 2/1990 | Michl et al. |
| 4,963,923 A | 10/1990 | Kusano et al. |
| 5,132,791 A | 7/1992 | Wertz et al. |
| 5,163,368 A | 11/1992 | Pensavecchia et al. |
| 5,218,434 A * | 6/1993 | Vinck ........................... 358/76 |
| 5,689,425 A | 11/1997 | Sainio et al. |
| 5,791,249 A | 8/1998 | Quadracci |
| 5,791,251 A | 8/1998 | Kistler et al. |
| 5,841,955 A | 11/1998 | Wang |
| 5,907,999 A | 6/1999 | Lusar et al. |
| 5,966,218 A | 10/1999 | Bokelman et al. |
| 5,967,049 A * | 10/1999 | Seymour et al. ............. 101/484 |
| 5,992,318 A | 11/1999 | DiBello et al. |
| 6,002,842 A * | 12/1999 | Oshlo et al. ................. 358/458 |
| 6,020,954 A | 2/2000 | Aggarwal |
| 6,050,192 A | 4/2000 | Kipphan et al. |
| 6,318,260 B1 * | 11/2001 | Chu et al. .................... 101/365 |

FOREIGN PATENT DOCUMENTS

| EP | 085 750 | 8/1983 |
| EP | 0 658 428 | 6/1995 |
| JP | 49-8312 | 12/1992 |

* cited by examiner

Primary Examiner—Eugene Eickholt
(74) Attorney, Agent, or Firm—Cohen, Pontani, Lieberman & Pavane

(57) ABSTRACT

An ink regulating device that measures color in a web-fed rotary printing machine for printing a printing material web or sheets in a plurality of colors. The ink regulating device measures and evaluates the colors black, cyan, magenta, and yellow, and after general calibration (i.e., the recording of standard values), derives set values for the inking zone setting devices, without requiring any further patterns, and without the need for a special copy when the printing pattern is changed.

8 Claims, 2 Drawing Sheets

INK REGULATION DEVICE FOR A PAINTING MACHINE

This application is a Divisional of U.S. patent application Ser. No. 09/238,342, filed Jan. 27, 1999 now abandoned.

BACKGROUND OF THE INVENTION

1. Field of the Invention

The invention relates to printing machines, and more particularly to an ink regulation device for a printing machine.

2. Description of the Related Art

U.S. Pat. No. 4,488,808 discloses a print inspecting device for testing printing products, in which the entire printing area is scanned by a plurality of light-emitting and light-receiving units. The units are arranged in a straight line transverse to the direction of movement of the printing material. In order to check the printing quality, the image data generated by the light emitting recovery units are compared with standard image data. In operation, light is beamed onto the printing product for each inking zone by means of a halogen or tungsten lamp and the reflected light is measured by means of two photodiodes which are sensitive in different wavelength ranges. The light intensity is measured only in two wavelength ranges, not over the wavelength continuum in the visible range. It is therefore not possible to have an absolute measurement, but only a relative measurement, as compared with a color pattern. That is, only comparative measurements with respect to a printing pattern can be carried out. In addition, there is no provision for regulating the inking zone setting means.

SUMMARY OF THE INVENTION

It is therefore an object of the present invention to improve a printing machine of the type initially mentioned, such that accurate color measurement for each inking zone is possible and that, irrespective of the subject to be printed, a correct setting of the desired color reproduction in the inking zones is produced when all the material combinations, that is to say printing ink and printing material, are known.

This and other objects are achieved according to the invention by an ink regulation apparatus that determines the ink distribution for each inking zone and each printing sheet by means of measuring elements positioned on the running printing material web or the successive printing sheets (inline ink measurement). The necessary calibration of the measuring channel is carried out by the white calibration of the paper and by full-tone and half-tone prints in the individual printing inks on sample prints by means of the printing machine. The ink coverage is set by means of hand densitometers. The sample prints are produced during the commissioning of the ink regulating system or when the requirement profile changes, that is to say when other printing inks or other printing papers are used.

Since black is obtained by color addition when the three basic colors, cyan, magenta and yellow, are printed one on top of the other, a special measuring device is necessary in order to regulate the "color" black. The measuring instrument has to find the three basic colors, cyan, magenta and yellow, as well as black again in the same ratio in the printing product as that in which the ink was broken down into these colors by the preliminary printing stage. The ratio between the basic colors must be reflected in the color spectrum, considered and, consequently, in the measured values of the product. Coordinating the filters of the preliminary printing stage and of the ink regulating instrument makes it possible for the measured values to be assigned directly, even without any test prints.

According to the invention, it becomes possible for a closed regulating circuit to be made between the preliminary stage data and the final product printed with printing inks. Changes to the operating cycle of the printing machine, such as roller spacing changes, have less influence in the regulating method according to the invention, as compared with conventional ink regulating methods, since machine changes are eliminated by precise ink regulation. Another advantage is that the printing sheet is actually assessed in zones and not only at particular points, as when color measuring strips are used. The clearly defined assignment of an inking zone and corresponding measured value makes evaluation simpler and quicker, in contrast to evaluation by cameras. The parallel and simultaneous zonal measurement of the inking on each printing sheet makes it possible to regulate more quickly than in the case of the sequential zonal sensing of all the inking zones. According to the invention, all the inking zones are recorded simultaneously. This is important, particularly for regulation in the run-up phase, in order to compensate for variations quickly.

As compared with the use of cameras, the advantages of the present invention are that there is no need to convert RGB values into the CMYK model. Problems due to spherical or chromatic aberration do not arise when the entire web width is covered.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Unlike the prior art methods of using color measuring strips on the paper to be printed or on another printing material in order to find a parameter for setting the ink quantity or for ink regulation, the ink distribution according to the present invention is determined for each inking zone by using measuring elements on the running printing material web or on the running printing material sheets. As a result, the ink distribution may be measured either on each individual printing sheet or only on a specific number of printing sheets which are selected according to a fixed time interval.

The necessary calibration of the measuring element is carried out by ink measurement on the non-printed printing material. Fulltone and halftone prints in the individual colors, black, cyan, magenta and yellow, are produced in sample prints on the printing machine and calibrated by means of hand densitometers. Sample prints are produced in each case during the commissioning of the ink control or ink regulating system or when the requirement profile changes. This is the case when another color palette is selected or when other printing papers or printing materials are to be used.

Figure 1:
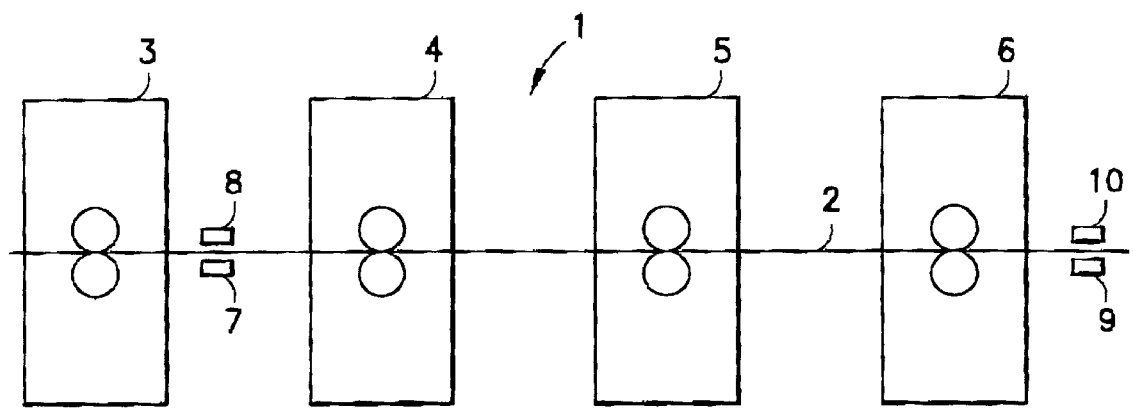
FIG. 1 is a diagram of a printing machine having four printing units and two measuring devices according to an embodiment of the invention.

Since black is obtained when the three basic colors, cyan, magenta and yellow, are printed one on top of the other, a special measuring arrangement is necessary in order to regulate the "color" black. Accordingly, FIG. 1 diagrammatically shows a printing machine 1 for printing on a printing material web 2. The printing material web 2 runs through printing units 3, 4, 5 and 6. The printing units 3, 4, 5 and 6 are designed in each case as double printing units, for printing on both sides of the printing material web 2. The cylinders directly printing the printing material web 2 itself are illustrated in each case. In printing unit 3, the printing material web 2 is first printed with black ink. The printing material web 2 running out of the printing unit 3 is measured on both sides by second measuring elements 7 and 8. The printing material web 2 thereafter runs through the remaining printing units 4, 5 and 6, in which it is successively inked with the colors, cyan, magenta and yellow. The printing material web 2 thereafter runs through first measuring elements 9 and 10, in which the inking with the colors, cyan, magenta and yellow, is measured.

Figure 2:
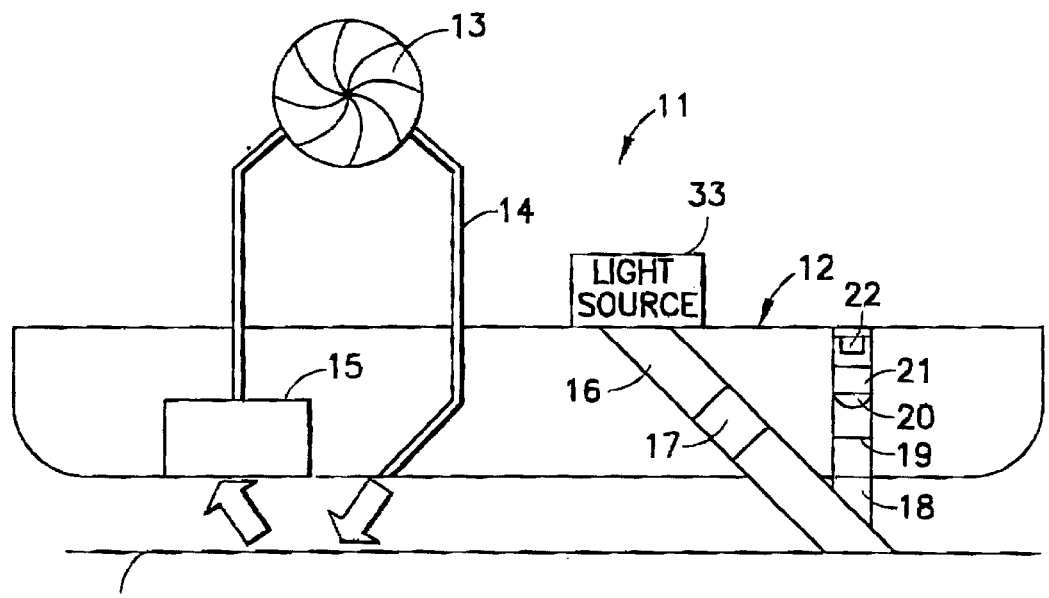
FIG. 2 is a schematic representation of a measuring element according to an embodiment of the invention.

Each of the measuring elements 7 to 10 are configured as illustrated by measuring element 11 in FIG. 2. In measuring element 11, the reflection of standard light, (i.e., light with a known intensity distribution or of light with a constant intensity distribution over the wavelength), by the printing material web 2 is measured in zones. For this purpose, there is a closed measuring chamber 12, which eliminates any influences of ambient light. The printing material web 2 running by measuring element 11 is first cleaned of paper fluff and other impurities by air which is supplied by means of a blower 13 and via a supply line 14. The paper fluff and other impurities are then absorbed by a dirt filter 15. The air supplied by blower 13 forms an air cushion which dampens oscillations generated by gap impacts or vibrations of the drier. The printing material web 2 is exposed to light, generated by light source 33, via light waveguide 16 which is polarized by means of a polarizing filter 17 according to the respective inking zone. The polarized light is partially reflected by the printing material web 2. The beam of reflected light 18 is polarized by a polarizing filter 19 which is rotated through 90° relative to the polarizing filter 17. The light is focused onto a defraction grating 21 via convergent lens 20, which scatters it in such a way that a CCD (charge coupled device) element 22 is exposed. The CCD element 22 consists of a row of individual elements which in each case cover a small wavelength range. The intensity of the light over the wavelength can be detected by means of this device. For each of the inking zones located next to one another, a measuring element records the respective intensity distribution as a function of the wavelength. For the measuring elements 7 and 8 arranged in each case above and below the printing material web 2 or for the measuring elements 9 and 10, mountings can be provided, by means of which the measuring elements 7 and 8 or 9 and 10 can be moved away from the printing material web 2 in a scissor-like manner (i.e., opened away from web 2 in a substantially perpendicular motion relative thereto) so that they can be cleaned and/or otherwise handled. When the rotary printing machine 1 is restarted, measuring elements 7, 8 and 9, 10 are moved up to the printing material web 2 (i.e., closed toward web 2) again.

Figure 3:
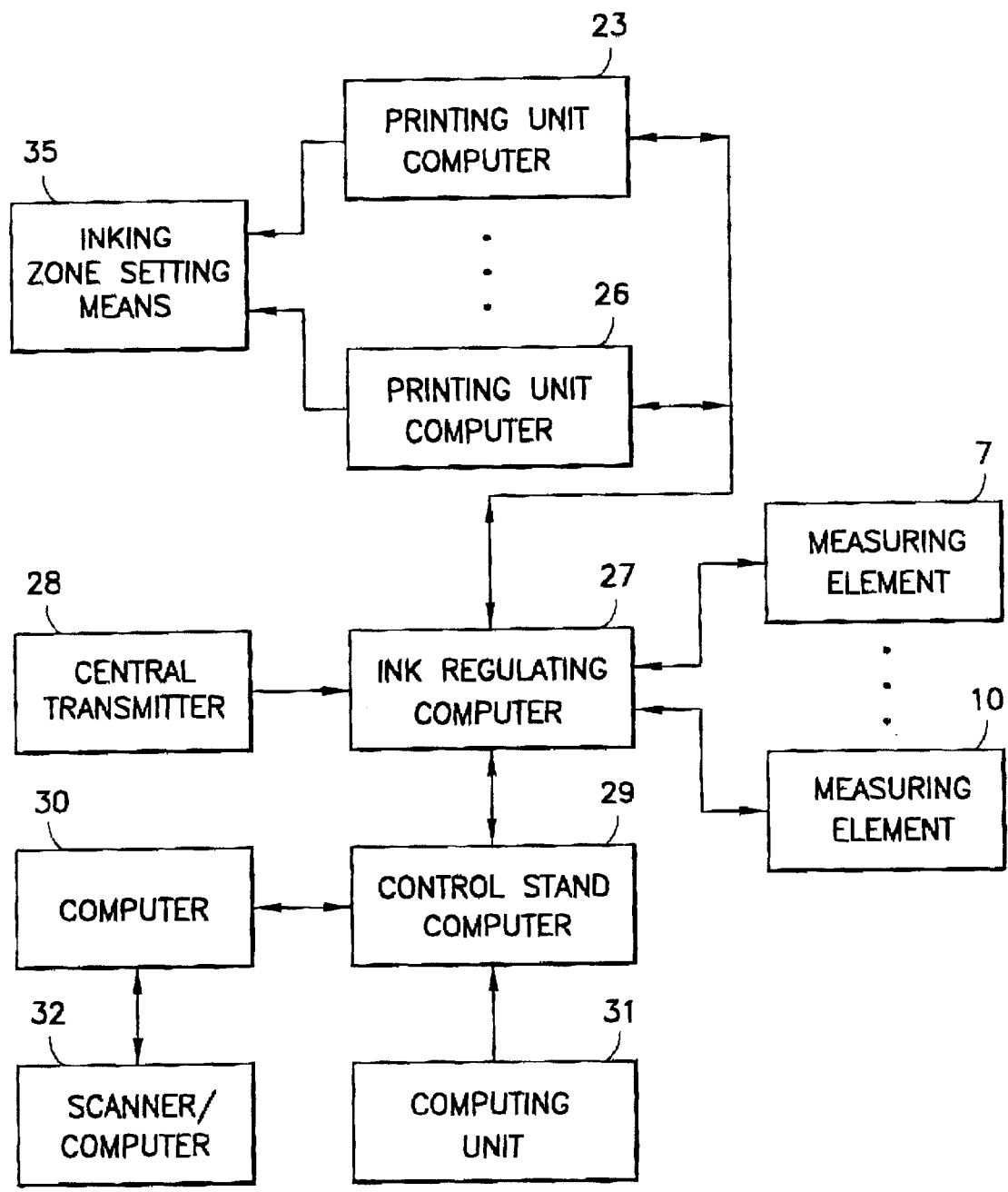
FIG. 3 is a block diagram of the communication paths for ink regulation according to an embodiment of the invention.

An ink regulating computer 27 (FIG. 3) sums the intensity distribution either over a particular period of time corresponding to the run through of a printing sheet or over small time intervals which correspond in total to the run through of a printing sheet.

As described, each of the measuring elements 7–10 are arranged on both sides of the printing material web 2 such that each measuring arrangement formed by the pairs of measuring elements 7 and 8 or 9 and 10 can be moved away from the printing material web 2 during a machine standstill and moved up to it again during restarting in a scissor-like motion.

Each of the measuring elements 7–10 is calibrated separately according to the printing material to be printed and the printing ink used. In the present example, measuring elements 7–10 are separately calibrated according to the printing units 3–6. In the first place, calibration with the printing material alone, that is to say with 0% printing ink, is carried out, for adaptation to the printing background. Print copies for fulltone and for 20%, 40%, 60% and 80% halftone screens are then produced and are printed in succession on the printing machine. The inking zones are set and checked by means of hand densitometers. A calibrating algorithm records, for each inking zone, the scanner measured value (the printing preliminary stage-value), the inking zone value and the associated ink distribution curve. Calibration takes place at a setting-up speed, of the printing machine 1, so that the inking zone values can likewise be considered in a standardized manner. The inking zone values thus obtained serve as initial values for ink regulation. A table with scanner measured values (printing preliminary stage values), inking zone values and ink distribution curves for each printing unit is thus obtained for each inking zone.

After the presetting of the inking zones, the printing machine 1 is run up to the setting-up speed. After the starting sequence (throw-on of the dampening duct roller, inking duct roller, inking unit, "print on", etc.) has been triggered, clearance for ink regulation is obtained after a particular number of revolutions of the printing cylinders. Regulation takes into consideration the ink continuum for each inking zone and compares it with the scanner measured values (or the preliminary stage values). Starting from the preliminary stage values, new desired value curves are produced linearly from the distribution curves obtained during the calibrating operation. These ink distribution curves give values for opening inking zone setting means 35. These values are then varied by means of regulation, until the desired ink distribution curve is produced, with the exception of a hysteresis to be specified. If, during a regulating step, the maximum set value of the inking zone setting means of an ink fountain exceeds or falls short of an amount to be specified, the inking duct roller is corrected by the ink regulating system.

As already described above, the second measuring elements 7 and 8 measure the inking of the printing material web 2 with black ink by the printing unit 3. The ink distribution curve is in each case measured in zones. Comparison with 100% ink coverage and a minimum ink coverage, that is to say the ink coverage corresponding to the non-printed printing material, gives a percentage value for ink coverage which is compared with the value from the preliminary stage (scanner measured value). If the measured value is lower than the surface coverage identified by the preliminary stage, ink regulation must open the inking zone setting means 35. If the measured value is higher than the preliminary stage value, the respective inking zone setting means 35 must be closed again. The value which first determines the opening of the inking zone setting means 35 is obtained from the preliminary stage value.

Ink coverage with the printing inks, cyan, magenta and yellow, is measured by means of the first measuring elements 9 and 10. The ink continuum measured here for each inking zone is damped by the amount which was determined for the black printing ink. The color intensity which can be achieved here consequently cannot reach 100%, but, for example, only 40%. Apportionment to the three colors, cyan, magenta and yellow, therefore together amounts to, for example, 40%. A spectral range is defined for each of these printing inks, the same applying correspondingly to special inks. The measured value is obtained by integrating the resulting intensity of the wavelength for each ink, by interpolation, as compared with the ratio determined from the preliminary stage in the opening value for inking zone setting means 35.

The operator can act on the regulation of the printing ink manually by adjustments on the color desk. Ink regulation is then interrupted for a particular period of time which is inversely proportional to the machine speed. In this case, the desired ink distribution curve is replaced by the ink distribution curve actually measured on the basis of the inking zone opening predetermined by the operator. Regulation accordingly takes place on the basis of the measured actual value of the ink distribution curve.

The actual value of the ink distribution is recorded as early as possible for each printing operation, i.e., as soon as the operator considers that the printed color values are correct. Since the ink distribution curves are recorded for each inking zone, these curves can be used again as pre-set values for subsequent print productions.

The measuring elements 7–10 are connected to an ink regulating computer 27 which, in turn, can determine the measured circumferential position of the printing cylinder relative to the printing sheet via signals from a central transmitter 28. The ink regulating computer 27 is operated via a control stand computer 29, (i.e., the function keyboard). The scanner or preliminary stage values, the printing units used, web guidance, the inking zones cut out, the printing inks used, the printing material used and the inking zone pre-set values are supplied to the control stand computer via a technical production planning computer 30, so that these values can be transferred to the ink regulating computer 27. The technical production planning computer 30 in turn, receives, via control stand computer 29, the measured values from the ink distribution curves, as measured during the printing process, for a repeat production. The control stand computer 29 delivers to the operator a general automatic on/off preselection or individual automatic on/off preselection, a calibrating menu with the necessary data for setting inking zone setting means 35, instructions for color filter curves by the operator or default values and assignment of the color filters to the printing units for the ink regulating computer 27. Each of the printing units 3–6 is equipped with a respective printing unit computer 23–26 which in each case delivers the inking zone set values to the inking zone setting means, even when these values change in the event of manual action by the operator. The printing unit computers 23–26 also generate the values for the inking and damping duct roller speed for each inking unit and damping unit respectively and deliver these values to the ink regulating computer 27. In the case of active regulation, the ink regulating computer 27, in turn, delivers the inking zone desired values and the desired values for the inking duct and damping duct roller speed to the respective printing unit computer 23–26.

The ink regulating computer 27 is activated, in turn, by means of a central transmitter 28 which provides a signal representative of the position of the printing sheet between the measuring elements 7–10 (measuring bar). A control stand computer 29 delivers regulating clearance from the technical production planning computer 30. The control stand computer 29 is switched on by the operator according to whether general automatic on/off preselection or individual automatic on/off preselection is desired. The operator can also predetermine a calibrating menu with the necessary data for setting the inking zone values as well as color filter curves or default values via the control stand computer 29. The measuring elements 11 are assigned to the printing units 3–6 and to the ink regulating computer 27 by means of the control stand computer 29.

The computer 30 is connected to a scanner or computer 32, in which the preliminary stage image signals and information are stored. The computer 30, via the control stand computer 29, delivers information relating to the scanner or preliminary stage values, the printing units 3–6 used in each case, the associated web guidance of the printing material web 2, the inking zones cut out, the printing inks used, the printing material used and the inking zone pre-set values. The control stand computer 29 is connected to a computing unit 31 which controls regulating clearance for the printing machine 1.

The invention provides a device for color measurement in a web-fed rotary printing machine 1 for printing a printing material web 2 or sheets in a plurality of colors, with separate measurement and evaluation of the colors, black, cyan, magenta and yellow, being possible. After general calibration, (i.e., the recording of standard values), set values for the inking zone setting means can be derived, even without any further patterns, without the need for a special copy when a printing pattern is changed.

The invention is not limited by the embodiments described above which are presented as examples only but can be modified in various ways within the scope of protection defined by the appended patent claims.

I claim:

1. A method for zonal color measurement covering at least essentially an entire length of a printing subject in a rotary printing machine having a plurality of printing units for printing a moving printing material in a plurality of colors, comprising the steps of:

continually measuring color intensity of printing inks cyan, yellow and magenta in each inking zone with a common measuring device;

continuously measuring ink intensity in each inking zone of black printing ink with a separate measuring device;

damping the measured ink continuum for each inking zone by the magnitude of the color intensity determined for the black printing ink, the measuring devices each comprising a light source for each inking zone;

comparing the ink continuum measured by the measuring devices and one of scanner measured values and preliminary stage measured values and generating desired ink distribution curves which contain the inking zone values for each printing ink using a regulating device assigned to each of the measuring devices; and fixing the inking zone desired values and delivering regulating values for opening inking zone setting means with an ink regulating computer of the regulating device.

2. A method as defined in claim 1, including transferring the regulating values via the ink regulating computer to printing unit computers respectively assigned to the printing units.

3. A method as defined in claim 2, including transferring desired values for rotational speeds of one of an inking duct roller and a damping duct roller to the respective printing unit computers via the ink regulating computer.

4. A method as defined in claim 3, including delivering in each case the inking zone set values, a change in the inking zoning set values and values for the inking duct and damping duct roller speed via each of the printing unit computers.

5. A method as defined in claim 1, wherein each of the measuring devices includes a measuring chamber through which a light source beams light with a known intensity distribution onto the printing material, and a CCD element for receiving light reflected by the printing material web or printing sheets for each inking zone to enable further processing of the reflected light signal.

6. A method as defined in claim 5, further including blowing air onto the printing material via a blower operatively arranged at the measuring chamber, and absorbing impurities entrained by the blowing air with a dirt filter.

7. An ink regulating device in a rotary printing machine having a plurality of printing forms for printing a printing material in a plurality of colors, and enabling color measurement of an entire length of a printing subject in zones, the ink regulating device comprising:

first measuring elements operatively arranged in each inking zone for measuring an ink continuum of cyan, yellow and magenta printing inks;

second measuring elements separate from the first measuring elements operatively arranged in each inking zone for measuring an ink continuum of black printing ink, each of the first and second measuring elements comprising a light source for each inking zone; and ink regulating computer means connected to the first and second measuring devices for comparing the measured ink continuums with other provided values and generating desired ink distributions curves which contain inking zone values for each printing ink, the ink regulating computer means fixing desired inking zone values and delivering regulating values for controlling inking zone setting means, each of the first and second measuring devices being configured so as to be movable away from and toward the printing material in a scissors-like motion so as to enable cleaning and operational positioning of the measuring devices.

8. An ink regulating device as defined in claim 7, wherein the first and second measuring devices are respectively arranged between individual of the printing units.

* * * * *